United States Patent [19]

Bataev et al.

[11] 4,057,453
[45] Nov. 8, 1977

[54] METHOD FOR MANUFACTURING AND LAYING OUT PHASE CORES FOR OIL-FILLED CABLES AND A DEVICE FOR ACCOMPLISHING SAME

[75] Inventors: Mikhail Kirillovich Bataev; Isaak Efimovich Veits; Sergei Sergeevich Gorodetsky; Lev Ilich Macheret; Lev Alexeevich Kuznetsov; Albert Vasilievich Tjurin; Jury Eduardovich Yaunzem, all of Moscow, U.S.S.R.

[73] Assignee: Vsesojuzny Proektno-Izyskatelsky Nauchno-Issledovatelsky Institut "Gidroproekt" imeni S. Ya. Zhuka, Moscow, U.S.S.R.

[21] Appl. No.: 592,667

[22] Filed: July 2, 1975

[51] Int. Cl.$^2$ ............................................. B32B 1/00
[52] U.S. Cl. ..................................... 156/390; 156/48; 156/51; 174/10; 174/12 R
[58] Field of Search ............... 156/48, 1, 390; 118/50, 118/64, 420, 423; 174/10, 12 R, 13; 206/328, 398

[56] References Cited

U.S. PATENT DOCUMENTS

| 2,046,364 | 7/1956 | Bennett | 174/1 D X |
| 2,454,962 | 11/1948 | Brown | 174/12 R |
| 2,605,738 | 8/1952 | Grieve | 118/50 |
| 3,054,382 | 9/1962 | Ebel | 118/50 X |

FOREIGN PATENT DOCUMENTS

| 440,499 | 1/1936 | United Kingdom | 174/10 |
| 918,561 | 2/1936 | United Kingdom | 118/50 |

*Primary Examiner*—David A. Simmons
*Attorney, Agent, or Firm*—Fleit & Jacobson

[57] ABSTRACT

The invention relates to a method of manufacturing phase cores for oil-filled cables and apparatus therefor, whereby a current-carrying core is obtained by means of twisting together a number of individual wires, then a paper insulation tape is wound around the current-carrying core and the insulated current-carrying core is reeled on a drum, after which the core is dried, impregnated with an insulating compound and placed in a provisional sealed housing for the period of storage and shipment to the site where the core is to be laid out and inside which the core is subjected to the required electrical measurements and insulation tests. The current-carrying core is placed inside the provisional sealed housing right after it is has been wound with the paper insulation tape.

7 Claims, 7 Drawing Figures

METHOD FOR MANUFACTURING AND LAYING OUT PHASE CORES FOR OIL-FILLED CABLES AND A DEVICE FOR ACCOMPLISHING SAME

The invention relates to the field of electrical engineering and in particular to the manufacturing of electrical cables, namely, of phase cores for oil-filled cables, and to a device to accomplish this method.

Known in the art is a method of manufacturing phase cores for oil-filled cables which envisages the following operations.

At first a current-carrying core is obtained by means of twisting together a number of individual wires. Then the core obtained in this way is wound with a paper insulation tape while the insulated core is reeled on a drum. After that the insulated current-carrying core reeled on the drum is dried and impregnated with an insulating compound. Then the insulated current-carrying core is pressurized to which end it is coated with a provisional lead sheath serving as a provisional sealed housing for the period of storage and shipment of the core to the site where it is to be layed out. After that the phase core of an oil-filled cable manufactured in this way is subjected to electrical measurements and insulation tests. To apply the provisional lead sheath the current-carrying core is unreeled from the first, above mentioned drum. Then, along with the application of the provisional lead sheath the sheathed phase core of an oil-filled cable is reeled onto another drum on which it is stored and shipped to the site where it is to be layed out. In the course of laying out the oil-filled cable when one or several of its phase cores is pulled through the permanent sealed housing the function of which is usually performed by a steel pipeline to be filled with an insulating compound under a high pressure, the provisional lead sheath is removed just prior to inserting said phase cores of the cable into the pipeline.

The known method of manufacturing phase cores for oil-filled cables suffers from the following major drawbacks: the production process is rather complex since it requires that the insulated current-carrying core should be coated with a provisional lead sheath and that this core should be unreeled from one drum and reeled onto another; the manufacturing procedure requires that supplementary equipment should be used to apply the provisional lead sheath; the consumption of a deficit material (lead) is rather heavy; the cable layout process is quite complex since it requires that the provisional lead sheath should be removed before the phase core of the oil-filled cable is inserted into a pipeline; the possibility of damaging the core insulation in the course of removing the lead sheath. All these drawbacks lead eventually to the increase of the cost of both the cable and its layout procedure as well as to the reduction of its operationsl reliability.

The object of the present invention is to provide a method of manufacturing phase cores of oil-filled cables which would eliminate the above drawbacks as well as to develop a device for accomplishing this method.

The invention is based on a manufacturing procedure which dispenses with the application of the provisional sealed coating along the whole of the insulated current-carrying core. This is achieved by means of providing a method of manufacturing a phase core for oil-filled cables whereby: a current-carrying core is obtained by means of twisting together a number of individual wires, then the core is wound with an insulating paper tape and the insulated core is reeled onto a drum, after which it is dried, impregnated with an insulating compound and placed in a provisional sealed housing for the period of storage and shipment to the site where the cable is to be laid out, then the core is subjected to the required electrical measurements and insulation tests, in which, according to the invention, the current-carrying core is placed inside the provisional sealed housing right after it has been wound with the paper insulation tape.

Preferably the proposed method is accomplished with the help of a device comprising a twisting machine for obtaining a current-carrying core by means of twisting together a number of individual wires, an insulating machine for winding the current-carrying core with paper insulation tape, a vacuum drier in which the insulated current-carrying core is dried and impregnated with an insulating compound, an instrumentation set for electrical measurements and insulation tests and a drum to receive the insulated current-carrying core, which, according to the invention, comprises also a container for said drum serving as a provisional sealed housing where the manufactured phase core of the oil-filled cable is dried, impregnated with an insulating compound, subjected to the required electrical measurements and insulation tests and pressurized, while said drum constitutes an element of the container where it is fixed so that it can be rotated. Alternatively, the container in the proposed device may comprise a shell housing the drum with the current-carrying core, a lid, a hatch through which the phase core of the oil-filled cable is drawn out of the container in the course of the cable layout procedure and a hatch in the container lid used for cable service purposes in the course of its manufacture and layout. Preferably the container in the proposed device is provided with a means compensating for temperature variations of the volume of the manufactured phase core and the insulating compound located in the container.

Preferably again the means compensating for temperature variations of the volume of the manufactured phase core and the insulating compound located in the container is provided with an elastic partition which divides said container into two airtight chambers. One chamber is a conserving one. It is filled with an insulating compound which protects the insulation of the phase core of the oil-filled cable from moisture. The other is a compensating one. It serves to compensate for temperature variations of the volume of the insulating compound and the phase core of the oil-filled cable. It is possible to design the proposed device so that the said elastic partition is placed on the drum making the internal space of the latter serve as the compensating chamber. The above elastic partition may also be located in the shell of the container. It is feasible that the proposed device be designed so that the elastic partition is located in the lid of the container.

Preferably again the internal space of the drum in the proposed device is made airtight and has an opening into the compensating chamber of the container.

The proposed method of manufacturing phase cores for oil- filled cables permits to simplify the production process at the factory and the cable layout procedure in the field to a considerable extent. It allows to use unsophisticated devices for manufacturing the phase cores, to reduce the quantity of mechanisms and jigs required to lay out oil-filled cables and to dispense with the use of deficit materials (lead).

The invention will be better understood from the detailed description of the proposed method and particular versions of the device to accomplish thereof given by way example with reference to the accompanying drawings in which:

FIG. 1 shows a block diagram of the proposed device for manufacturing phase cores of oil-filled cables;

FIG. 2 presents a container according to the invention in which the elastic partition is mounted on the lid;

FIG. 3 presents the same container as in FIG. 2 as viewed along arrow A;

Figure 6:
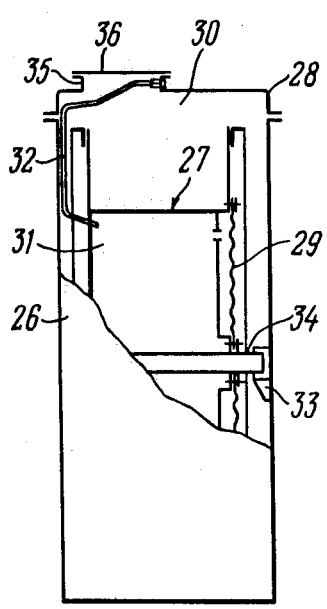
Figure 7:
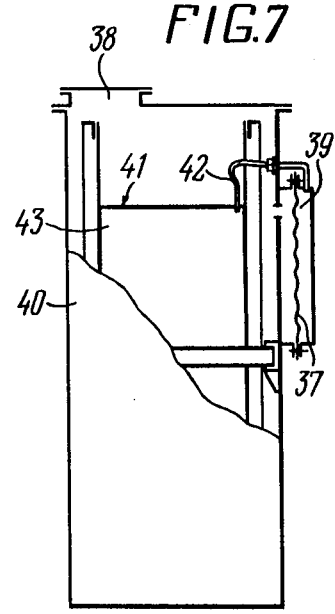

FIG. 6 presents a container according to the invention in which the elastic partition is mounted on the drum;

FIG. 7 presents a container according to the invention in which the elastic partition is mounted on the container housing.

The proposed method of manufacturing cores for oil-filled cables consists in performing succesively the following operations: a current-carrying core is obtained by means of twisting together a number of individual wires; a paper insulation tape is wound around the current-carrying core; the insulated current-carrying core is reeled onto a drum; the drum together with the insulated current-carrying core reeled onto it is placed into a provisional sealed housing; the insulated current-carrying core is dried and impregnated with an insulating compound inside the provisional sealed housing; the electrical characteristics of the core are measured and its insulation is tested and finally, the phase core of an oil-filled cable manufactured in this way is pressurized for the period of storage and shipment to the site where the cable is to be laid out. Hence, right after the paper insulation tape is wound onto the current-carrying core the insulated current-carrying core reeled onto the drum is placed into the provisional sealed housing to be kept there until the finished phase core is inserted into the permanent sealed housing (a steel pipeline). Therefore, it is inside the provisional sealed housing that all the production procedures following the application of the paper insulation are performed at the factory (drying, impregnation with an insulating compound, electrical measurements, insulation tests and pressurization as well as storage in the inventory storeroom). Moreover, it is inside the same housing that the phase cores are shipped to the customer and are stored with him until they are laid out as cables.

Figure 1:
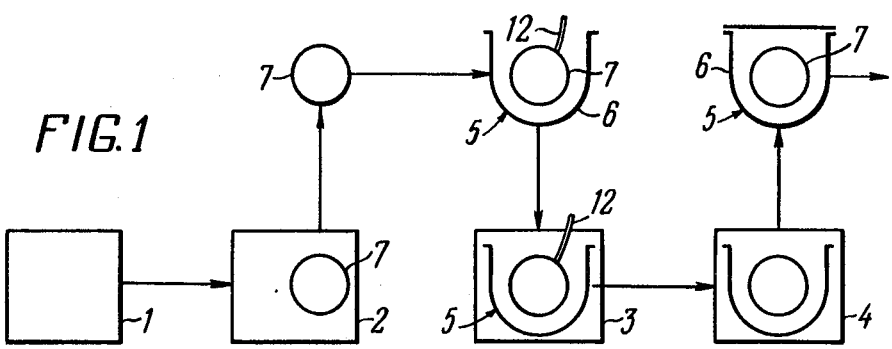

A device to accomplish the proposed method comprises a twisting machine 1 (FIG. 1), an insulating machine 2, a vacuum-drier 3, an instrumentation set 4 for electrical measurements and insulation tests and a container 5 with a drum 7 to receive the insulated current-carrying core. To facilitate the understanding of the essence of the invention no details will be given in what follows about standard equipment (the twisting machine, the insulating machine and the vacuum drier) adequately described in available technical literature. The major assembly in the device which is to be described as allowing to accomplish the proposed method is the above mentioned container 5.

In one of the versions of the proposed device the container comprises a shell 6 (FIGS. 2 and 3), a drum 7 to receive the insulated current-carrying core 8 which is located inside the container shell 6 and a lid 9.

Built in the lid 9 is an elastic partition 10 which serves as a means compensating for temperature variations of the volume of the phase core and the insulating compound located inside the container.

Figure 4:
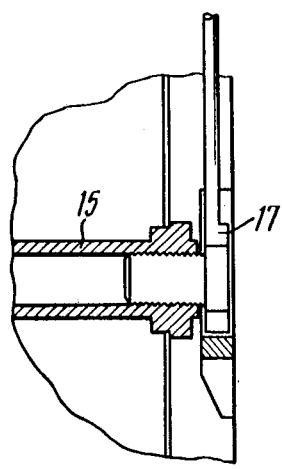
FIG. 4 shows a fixing means and a socket to mount the drum in the container (cross section along the drum's axis)
Figure 5:
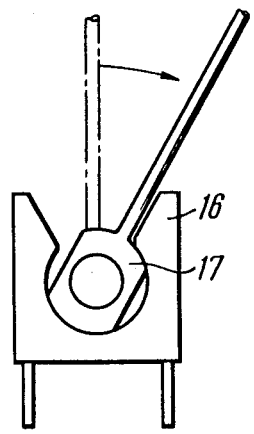
FIG. 5 shows the same (side view)

An internal chamber 11 of the drum 7 is made airtight and has an outlet through a pipe 12. The drum 7 is provided with spokes 13 which secure rims 14 serving to hold the insulated current-carrying core 8 on the drum 7 in the course of reeling and in case the container is displaced. The size of the drum 7 is selected so as it can hold the required length of the phase core to be manufactured. The drum 7 has an axle 15 whose ends are secured in sockets 16 when it is installed in the container. The axle is fastened with a stopper 17 (FIGS. 4 and 5) which prevents the drum 7 with the insulated current-carrying core reeled onto it from floating up after the container is filled with the insulating compound.

The elastic partition 10 (FIGS. 2 and 3) divides the contained into two chambers. The first chamber 18 is a conserving one. It is limited by the outer surface of the drum the cylindrical section of which holds the insulated current-carrying core reeled onto it. The second chamber 19 is a compensating one. It is limited by the lid 9 of the container and has access into the internal space 11 of the drum 7 through a pipe 12. Besides, the container is provided with a hatch 20 through which the phase core is drawn out to be pulled through a pipeline in the course of cable layout procedure, straps 21 used when it is required to lift the container, supports 22 and the lid 9 having a hatch 23 with a lid 24 of its own.

The phase core for an oil-filled cable is manufactured with the use of the above device as follows (FIGS. 1 – 5). A twisting machine 1 twists individual wires produced by standard drawing machines (not shown in the drawings) with subsequent annealing. Thus, a current-carrying core is obtained which is fed to a standard insulating machine 2 on which the current-carrying core is insulated by means of applying insulation paper tape onto it with a controlled tension, the ambient air being of predetermined humidity. The insulating machine is provided with a receiver (not shown in the drawings) which serves to reel the insulated core 8 onto the drum 7. After that the drum 7 with the insulated current-carrying core reeled onto it is placed inside the shell 6 of the container 5 while the pipe 12 is brought out so that it is above the edge of the shell 6 of the container 5. Then, the shell 6 of the container 5 with the drum 7 is installed in a vacuum drier 3 (this is a standard piece of equipment used to dry and impregnate oil-filled cables). Here, the paper insulation of the core is dried in vacuum and impregnated with an insulating compound, while the latter then fills the conserving chamber 18 of the container. The chamber 18 of the container is limited by the external surface of the drum 7 bearing the insulated current-carrying core 8, the walls of the shell 6 of the container 5 and the elastic partition 10. Simultaneously equal pressure is obtained inside the chamber 11 of the drum 7 and inside the vacuum drier 3. Therefore, when the paper insulation of the cable phase core is being impregnated the insulating compound will fill only the conserving chamber 18 of the container 5 and will not penetrate into the internal chamber 11 of the drum 7. After the core is dried, its insulation is impregnated and the container is filled with the insulating compound, the shell 6 is closed with the lid 9 and made airtight; the pipe 12 is attached to the lid 9 of the container, a required gas pressure is obtained inside the compensating chamber 19 and the finished phase core of an oil-filled cable located in the container is delivered to a test set 4 where it is subjected to the required electrical measurements and tests.

In order to perform these electrical measurements and tests the lid 9 is subsituted for a special lid designed for the purpose of such electrical measurements and insulation tests (not shown in the drawing). The leads of the finished phase core are brought out through this lid allowing required instruments and devices (not shown in the drawings) to be connected to the core. Then, the above mentioned instrumentation set is used to carry out the required electrical measurements and insulation tests. The measurements and tests being over, the leads of the cable phase core are cut off. One end of the core is secured to the drum and the other, to the hatch 20 using a wire rope 25. The drum 7 itself is attached to the shell 5 of the container 5. The pipe 12 of the container 5 is used to connect the compensating chamber with the internal chamber 10 of the drum 7. Then, the hatches 20 and 23 are closed and made airtight, the pressure in the container is set at the required level and the container is delivered to the stores and then shipped to the site where the cable is to be laid out.

The procedure of laying out the oil-filled cable consists in that a required number of phase cores is pulled through a pressurized steel pipeline prepared beforehand. The pipeline will serve as a permanent housing for the manufactured phase core. To this end the container 5 is installed right near the opening of the above pipeline, the hatch 20 is opened and the respective phase core end is attached to a pulling wire rope (not shown in the drawings) used to pull the phase core through the steel pipeline, while the hatch 20 is connected to the opening of said pipeline via removable attachments (not shown in the drawings). A required ambient pressure is set up in both said steel pipeline and in the container. The tension of the cable phase core while it is being pulled through the pipeline is controlled by adjusting the braking force of the drum 7. When the cable phase core is unreeled from the drum 7 the container 5 is disconnected from the opening of the pipeline and delivered to the cable factory to be used again.

Another version of the proposed device to accomplish the above method of manufacturing cable phase cores envisages that the container should be provided with a shell 26 (FIGS. 6, 7), a drum 27 to receive the insulated current-carrying core located inside the shell 26 of this container and a lid 28. Built in the drum 27 is an elastic partition 29 which separates a conserving chamber 30 with the cable phase core being manufactured and the insulating compound from the compensating chamber whose functions, in the given version of the container design, are performed by the internal cavity of the drum 27. The internal cavity of the drum 27 is pressurized and has an outlet in the form of a pipe 32. The pipe 32 is used to make the pressure in the internal cavity of the container equal to that in the vacuum drier when the core insulation is subjected to the vacuum drying procedure as well as to produce the required gas pressure in the container in which the cable is stored and shipped. The hatch through which the cable is unreeled, a socket 33 and the stopper 17 of an axle 34 of the drum 27 in the container, the straps for lifting the container and the supports are of the same design as those of the first version of the container described above. The procedure of manufacturing the cable phase core with the use of the machines 1, 2, 3 and 4 and stowing the finished cable in the container is similar to that described above for the first version of the container design. In this case the pipe 32 running from a cavity 31 of the drum is connected to a hatch 35 in the container lid in order to enable the operator to monitor the gas pressure in the compensating chamber and to produce the required pressure in the process of stowing the cable. This hatch is provided with a lid of its own. The procedure of placing the cable phase core in its permanent housing (an airtight steel pipeline) is the same as that described above for the first version of the container design.

Figure 2:
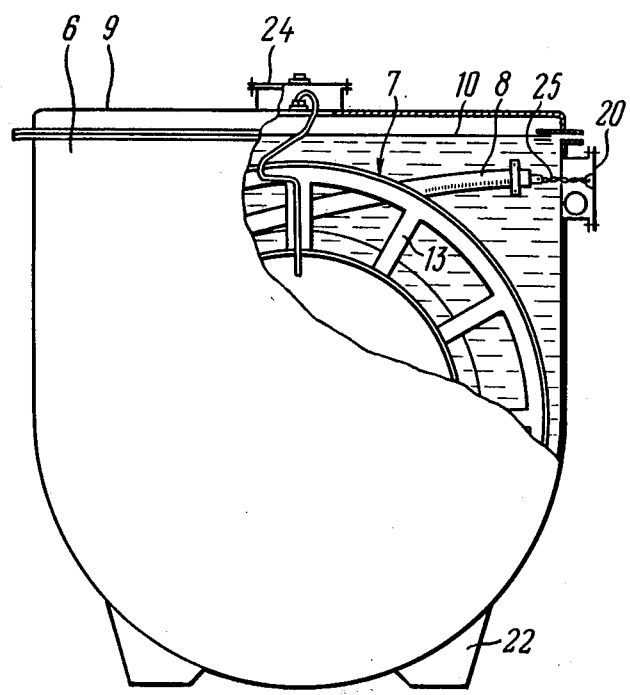
Figure 3:
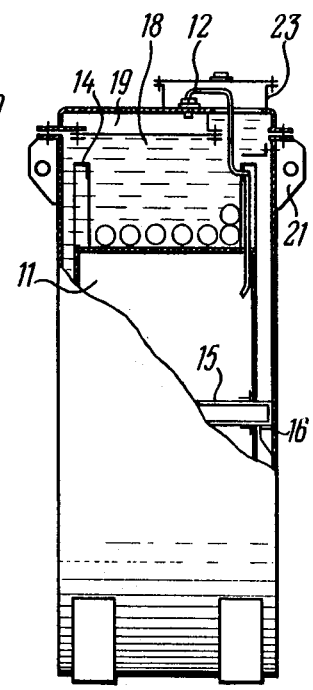

Still another version of the proposed device envisages that an elastic partition 37 (FIG. 7) which separates a conserving chamber 38 from a compensating chamber 39 should be mounted on a shell 40 of the container. A drum 41 to receive the cable phase core has a design similar to that of the drum used in the first version of the container (FIGS. 2 and 3). A pipe 42 is used to connect an airtight chamber 43 of the drum 41 with the compensating chamber 39, which provides for an increase of the compensating gas volume. All other container elements, the operation of the device for manufacturing phase cores of oil-filled cables, the procedure of placing the core in a permanent housing (a steel pipeline) in this case are similar to those used and employed with the first version of the container design.

A relatively small weight of the container designed for a low excessive pressure serves to facilitate its shipment. Moreover, the big size of the container compensating chamber, particularly in case it has access to the airtight internal drum chamber, as it has been described above, ensures a high degree of reliability in the course of long storage and shipment of the finished phase core to the site where the oil- filled cable is to be laid out. Since all the steps of the production process, starting with reeling the insulated current-carrying core onto the drum and ending with the cable layout, are carried out with the core being kept inside the container, there is no need in applying on and then removing from, the core the provisional pressurized housing (lead sheath) along the whole of its length.

What is claimed is:

1. A device for manufacturing phase cores of oil-filled cables comprising: a twisting machine used to obtain a current-carrying core by means of twisting together a number of individual wires, an insulating machine used to apply paper insulation onto said current-carrying core, a vacuum drier, an instrumentation means for making electrical measurements and insulation tests, a drum to receive the insulated current-carrying core, a container for said drum, wherein said drum is installed in said container for rotation, said container serving as a provisional sealed housing where the cable phase core is dried, impregnated with an insulating compound, subjected to electrical measurements and insulation tests and pressurized, wherein said container is provided with a means compensating for temperature variations of the volume of said cable phase core and said insulating compound located inside said container comprising an elastic partition dividing said container into a conserving chamber filled with an insulating compound to protect the insulation of the cable phase core from humidity effects, and a compensating chamber to compensate for temperature variations of the volume of said insulating compound and said cable phase core wherein the cavity of the drum is made airtight and has access to said compensating chamber of said container.

2. A device as claimed in claim 1 in which said container is provided with a shell to house said drum, a lid on said shell, a hatch, said hatch serving as an outlet through which the cable phase core is unreeled from said container in the course of the cable layout procedure, a lid hatch on said lid of the shell, said lid hatch serving to maintain said cable phase core in the course of its manufacture and layout.

3. A device as claimed in claim 2, wherein said elastic partition is placed on said shell of said container.

4. A device as claimed in claim 2, wherein said elastic partition is placed in said lid of the container.

5. A device for manufacturing phase cores of oil-filled cables comprising: a twisting machine used to obtain said current-carrying core by means of twisting together a number of individual wires, an insulating machine used to apply paper insulation onto said current-carrying core, a vacuum drier, an instrumentation means for making electrical measurements and insulation tests, a drum to receive the insulated current-carrying core, a container for said drum, wherein said drum in installed in said container for rotation, said container provided with a means compensating for temperature variations of the volume of said cable phase core and an insulating compound located inside said container comprising an elastic partition dividing said container into a conserving chamber filled with an insulating compound to protect the insulation of the cable phase core from humidity effects, and a compensating chamber to compensate for temperature variations of the volume of said insulating compound and said cable phase core, wherein said elastic partition is attached to said drum to transform the internal cavity of said drum into a compensating chamber.

6. A provisional sealed housing container comprising a shell, drum means rotatably mounted within said shell and adapted to receive cables, wherein the internal cavity of the drum is airtight, a lid for sealing said shell, temperature compensating means comprising an elastic partition dividing said container into a conserving chamber and a compensating chamber, and means for providing access between the internal cavity of said drum and said compensating chamber, wherein said temperature compensating means compensates for temperature variations within said conserving chamber.

7. A provisional sealed housing container comprising a shell, drum means rotatably mounted within said shell and adapted to receive cables, wherein the internal cavity of the drum is airtight, a lid for sealing said shell, temperature compensating means comprising an elastic partition dividing said container into a conserving chamber and a compensating chamber, said elastic partition attached to said drum wherein the internal cavity of said drum comprises the compensating chamber, wherein said temperature compensating means compensates for temperature variations within said conserving chamber.

* * * * *